United States Patent
Barker

(10) Patent No.: US 7,788,668 B2
(45) Date of Patent: Aug. 31, 2010

(54) SYSTEM AND METHOD FOR IMPLEMENTING DISTRIBUTED PRIORITY INHERITANCE

(75) Inventor: Thomas N. Barker, Vestal, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1483 days.

(21) Appl. No.: 11/148,329

(22) Filed: Jun. 9, 2005

(65) Prior Publication Data
US 2006/0282836 A1 Dec. 14, 2006

(51) Int. Cl.
*G06F 9/46* (2006.01)

(52) U.S. Cl. ....................... 718/103; 718/102

(58) Field of Classification Search ............... 718/103, 718/102
See application file for complete search history.

(56) References Cited

U.S. PATENT DOCUMENTS

| | | | |
|---|---|---|---|
| 5,515,538 A | 5/1996 | Kleiman | |
| 5,598,562 A | 1/1997 | Cutler et al. | |
| 5,608,893 A | 3/1997 | Slingwine et al. | |
| 5,812,844 A | 9/1998 | Jones et al. | |
| 5,862,083 A * | 1/1999 | Tobita et al. | 365/185.09 |
| 6,105,057 A * | 8/2000 | Kuftedjian et al. | 709/213 |
| 6,738,893 B1 * | 5/2004 | Rozas | 712/24 |
| 6,874,144 B1 * | 3/2005 | Kush | 718/103 |
| 7,069,557 B2 * | 6/2006 | Alferness | 718/102 |
| 7,334,229 B1 * | 2/2008 | McDonald et al. | 718/104 |
| 7,565,653 B2 * | 7/2009 | Inoue et al. | 718/103 |
| 2002/0138679 A1 * | 9/2002 | Koning et al. | 710/244 |
| 2005/0251667 A1 * | 11/2005 | Iwamoto | 712/233 |

* cited by examiner

*Primary Examiner*—Meng-Ai An
*Assistant Examiner*—Gregory A Kessler
(74) *Attorney, Agent, or Firm*—Whitham, Curtis, Christofferson & Cook, P.C.

(57) ABSTRACT

Priority inheritance is implemented across a distributed system, preferably by use of a mutual exclusion object, referred to as a pseudo-mutex, which provides operations for communicating priority of a task which is held to a different connected processor or node of a network and generating a dummy local command of priority at least equal to that of the held task at the remote processor or node in collaboration with a real-time operating system and middleware. The remote real time operating system then carries out priority inheritance in the normal manner to raise the priority of a blocked task, thus reversing any preemption of that task at the remote processor or node. The increase in priority avoids preemption of lower priority processes and thus increases the execution speed of the executing thread to release the existing lock at an earlier time; allowing a lock to be obtained by the higher priority thread. The middleware serves as an intermediary, communicating messages that include pseudo-mutex arguments or similar communications and requests for enabling priority inheritance across nodes.

17 Claims, 11 Drawing Sheets

SYSTEM AND METHOD FOR IMPLEMENTING DISTRIBUTED PRIORITY INHERITANCE

BACKGROUND OF THE INVENTION

1. Field of the Invention

The present invention generally relates to the field of distributed real-time systems. More particularly, this invention relates to a system and method for implementing priority inheritance in distributed real-time systems.

2. Description of the Prior Art

Real-time operating systems (RTOS) are those in which correctness and usefulness of the results depends not only on the logical results of computation, but also on the time at which the results are produced. Such systems may be distributed (e.g. use more than one processor, such as is shown in FIG. 1) or non-distributed (e.g. stand-alone systems). It should be understood that the level of abstraction represented in FIG. 1 also represents an environment which could include the invention and in which the meritorious effects of the invention could be achieved. It should also be understood that the illustration of a mutual exclusion (mutex) object and the depictions of operations of FIGS. 3-5 are arranged to facilitate conveyance of an understanding of the invention and no portion of any of FIGS. 1-5 is admitted to be prior art in regard to the present invention. Accordingly, these Figures have been labeled as being "Related Art".

A typical approach to designing real-time systems requires that the system be a federation of autonomous components (100, 110, 120), having common policies and protocols to provide aggregate functionality. Each processor (140) in a single or distributed real-time system will typically host multiple applications (e.g. software modules (150), a real-time operating system (RTOS) (170) and, optionally, a middleware layer (160). Real-time applications can be developed using a client/server, dataflow, publish/subscribe or other models. To illustrate the background related to this invention, the client/server model will be used for convenience and clarity of explanation, but a skilled practitioner will be able to port the concepts to other design models.

The interaction between clients and servers involves 10 over the network (130). The term IO Channel or just Channel is frequently used when describing the passage of messages between a specific pair of distributed modules. As such, the term Channel captures the SW concept associated with Open, then Read/Write and finally Close statements. The normal tasks associated with IO, addressing, data movement, synchronization, etc, can be either included in the application or relegated to the middleware.

A typical middleware will provide capability like that described by the Object Management Group's Common Object Request Broker Architecture (CORBA). Middleware formalizes the concept of servers and extends what was originally a single processor concept to the distributed environment. It makes services provided by the RTOS, Middleware and/or Application equivalent and it supports servers being called by synchronous (client does a write then a read to await results) or asynchronous (client does write but does not await results) invocations.

Typical RTOS provide for management of the application by allocating 'threads of control' to the application modules and by assigning relative priority values for these threads. As threads become ready-to-run the RTOS or Scheduler will consider the relative priority of the running and ready-to-run threads. If required, the current activity (e.g. a running or ready to run thread) will preempt a currently running thread of lower priority. Because some computing activities must be completed without interruption (hereafter called serially reusable resources), RTOS provide mutex locks (200) which are often implemented as object-oriented programming "objects". (Mutexes, however implemented, are well-understood in the art and standards for their implementation have been developed and are referred to as POSIX standards.) As illustrated in FIG. 2, these mutexes include identification (210) and state information for a locked state (220). and a held state (240), the owner of the lock (230) and operations for Seize (250) and Release (260) operations. In practice, each task requiring usage of a controlled resource applies for ownership of the mutex. Mutex processing either awards mutex ownership to the applicant thereby allowing it to use the resource or holds the applicant's thread. Release processing (260) resets ownership and, if required, promotes a held task to owner.

Client/Server connections frequently use services in chains, for example, Program A calls Program B, which calls Program C that in turn uses data from Program D. Because the RTOS and Schedulers are local to a processor, so are threads. However, middleware tends to hide the implementation details associated with multiple threads on the client and server sides, matching pairs of read/write statements and isolated tasks managed by two RTOS. As a result, developers have, for the purposes of analysis, enlarged the concept of thread and task to include all of the involved local threads and tasks. The term "Global Thread" or "Global Task" would be correct, but it is not always used.

Priority inversion (300) is an undesirable side effect of mutex and thread preemption processing. Referring to FIG. 3, consider tasks H, L and M with priority high, low and medium, respectively. Assume task L is running and it seizes resource mutex R (310), but is then interrupted as a result of the scheduler determining that Task M (320) has become ready to run. Then suppose that Task H is initiated (330) with the objective of satisfying some real-time constraint. Task H will interrupt Task M, but suppose Task H needs Mutex R. When it seizes R (340) it will be placed into R's queue (currently Task L owns Mutex R) and because H is no longer ready to run (350) the scheduler will cause Task M to resume. The problem this poses is clear; absent preemption, the Task H's delay will be Task L's locking period. With priority inversion Task H's locking period might be extended by the sum of all possible Task M execution periods, possibly an indeterminate value.

Priority inheritance (400) makes the owner of a mutex temporarily inherit the highest priority of any task being held by the mutex, but only for the period while it is actually the mutex owner. As shown in FIG. 4, when the previous example is changed to include priority inheritance, Task H, attempting to seize Mutex R, will change Task L into Task L(h) (400) (same task with temporary high priority). Task L(h) will immediately preempt Task M and proceed to completing its use of the resource. Release processing (420) will pass mutex ownership to Task H as desired, thereby eliminating the potential Task M related delays.

Effective priority inheritance also requires that the operation be applied recursively. It is possible that Task L after seizing Resource Mutex R also attempted to seize Resource Mutex R1, but was held because Task O (some other task) owned R1. To provide the recursive capability RTOS priority management services and mutex Priority Inheritance (270), local operations are developed to recognize and to respond to that condition.

In a distributed system, however, where the Task H, L and M considered previously are interpreted to be 'Global Tasks', priority inversion (500) can occur between processors as illustrated in FIG. 5. If Task L, running on Processor x, seizes Mutex R then invokes a remote server (520) it can be interrupted by a remote Task M (530) that may or may not require mutex R. (Even if Task M required mutex R, priority inheritance would not occur since Task L originates on a remote processor and processor y cannot raise its priority.) Task H can run on processor x (540) but when it attempts to seize Mutex R it will be held in the queue (560). In that situation locally based priority inheritance (570) will not be effective. Further, the degree of remoteness is not limited. In the client/server chaining alluded to above, Program A, B, C and D were connected. The priority inversion could occur between a Mutex in A and task interruption in D.

SUMMARY OF THE INVENTION

It is therefore an object of the present invention to provide a system and method for implementing priority inheritance globally across a distributed and/or open system to support performance as a real-time system.

It is another object of the invention to provide a system and method for reducing thread processing delay caused by priority inversion in an open, distributed, real-time system.

It is yet another object of the invention to use middleware based on the Common Object Request Broker Architecture (CORBA) as an intermediary to communicate, across nodes, messages enabling priority inheritance globally across an open, distributed, real-time system.

It is yet another object of the invention to provide a new type of mutual exclusion objects providing an operation for increasing the priorities of the owner and held threads of the mutex, across nodes of a distributed, open system.

It is a further object of the invention to provide mutual exclusion objects (mutexes) having an operation for dynamically establishing or terminating a forward pointer to a remote mutex, which may be on a remote node, thereby establishing or terminating a forward linkage for implementing distributed priority inheritance.

It is a yet further object of the invention to accomplish the above objects and allow determinate analysis of real-time performance of an open, distributed system without requiring changes to real-time operating systems or application software.

It is another further object of the invention to provide a mechanism for implementing priority inheritance globally and across nodes of a distributed system which does not require modification of operating systems and/or application software and without significant additional processing overhead.

To accomplish these and other objects of the present invention, a pseudo-mutex object is provided including operations for managing the priority of threads holding or held by the mutex and establishing and terminating communicative links to related pseudo-mutex objects across a distributed system, in collaboration with a real-time operating system and middleware. The middleware serves as an intermediary, communicating, across nodes, messages that include mutex arguments and requests for enabling priority inheritance.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 6:
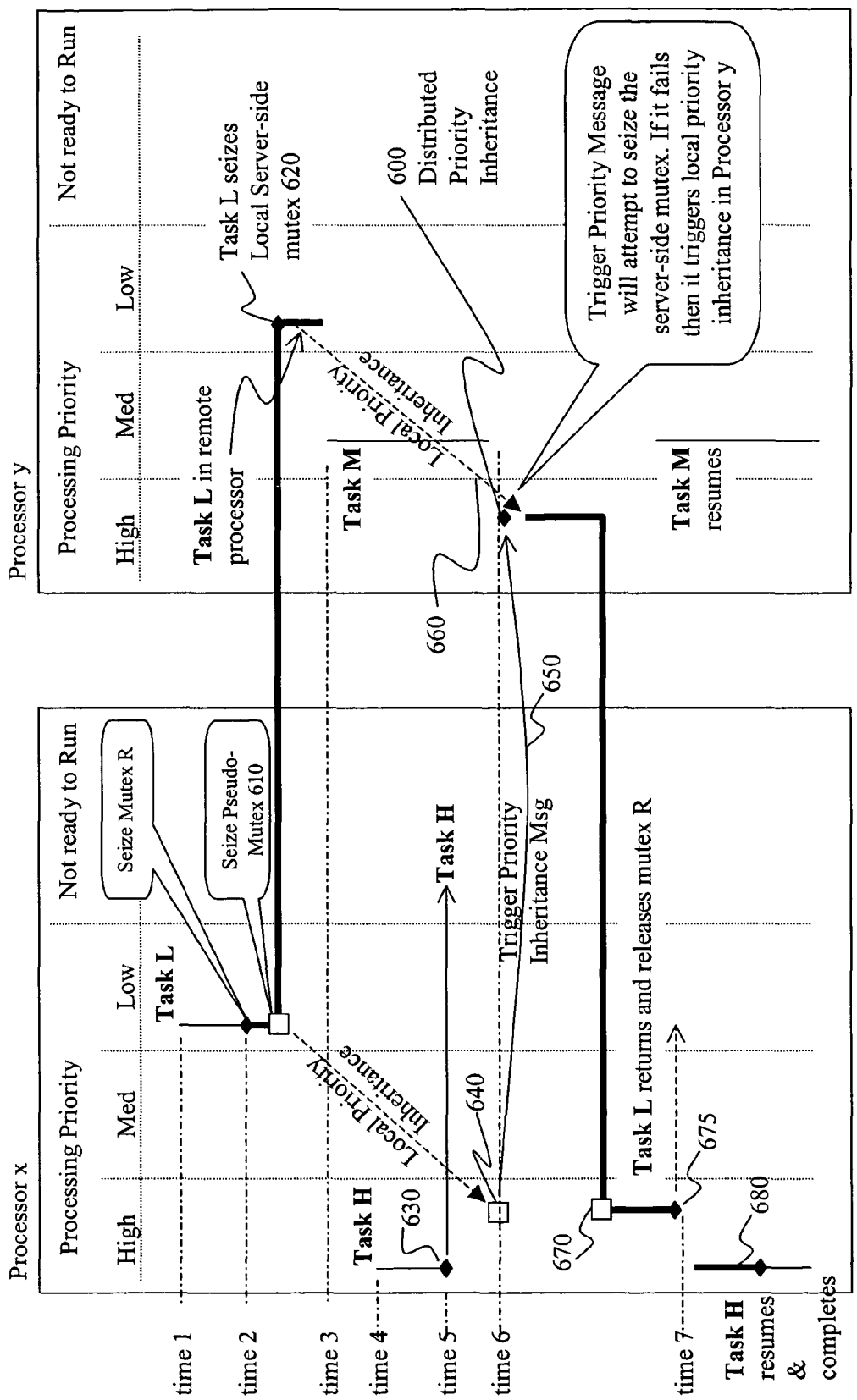
FIG. 6 is a timing diagram illustrating a solution to priority inversion by developing priority inheritance across a distributed system.

Referring now to FIG. 6, the invention introduces a mechanism to extend priority inheritance across inter-processor boundaries (600). Specifically, a mutex-like object, hereafter called a pseudo-mutex, is introduced, which on the surface appears to be a lock on the channel between two application modules. The pseudo-mutex differs from a normal mutex in that it has the capability to send over the channel a message that will trigger priority inheritance in the remote RTOS. A standard priority inheritance type mutex is used on the server side of the channel so that, in the remote processor, normal priority inheritance can be triggered.

Figure 1:
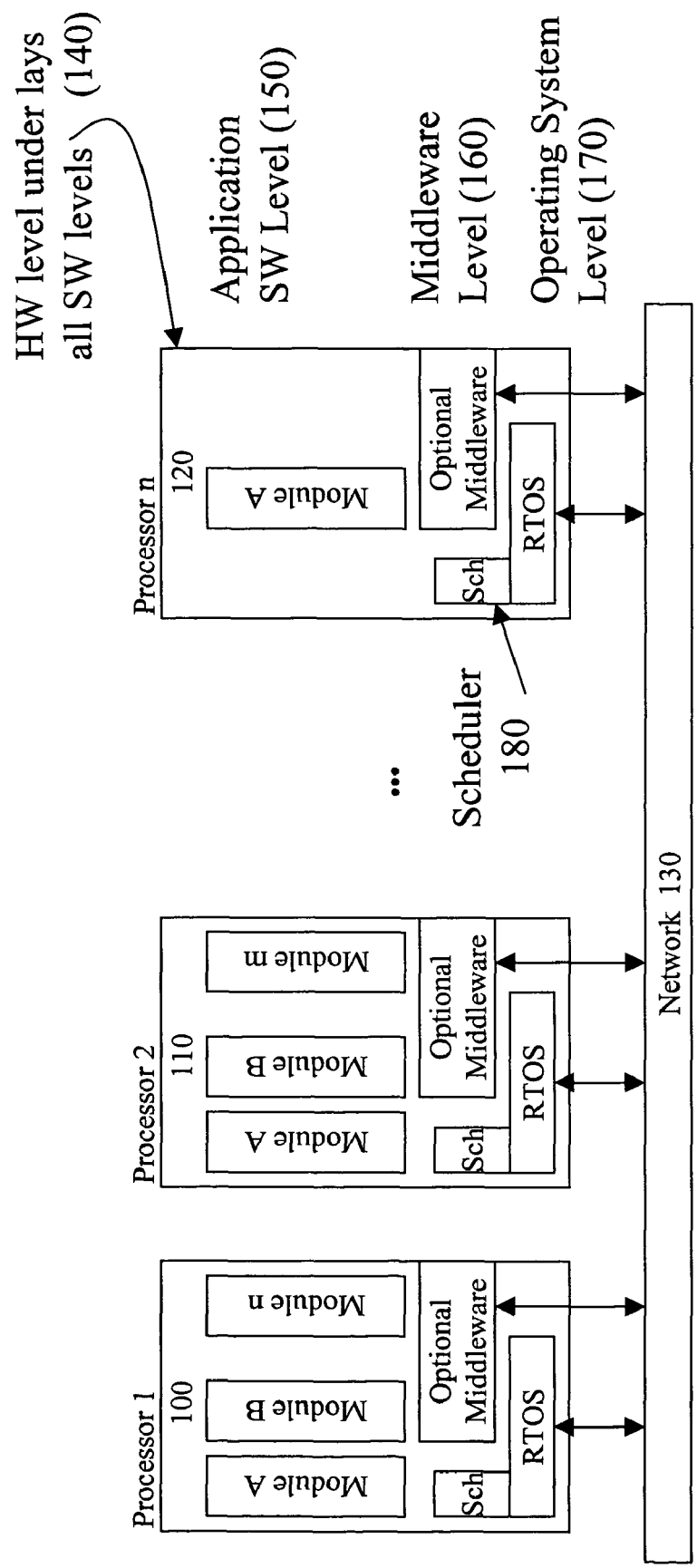
FIG. 1 is a high level block diagram of a distributed system to which the invention is applicable.
Figure 2:
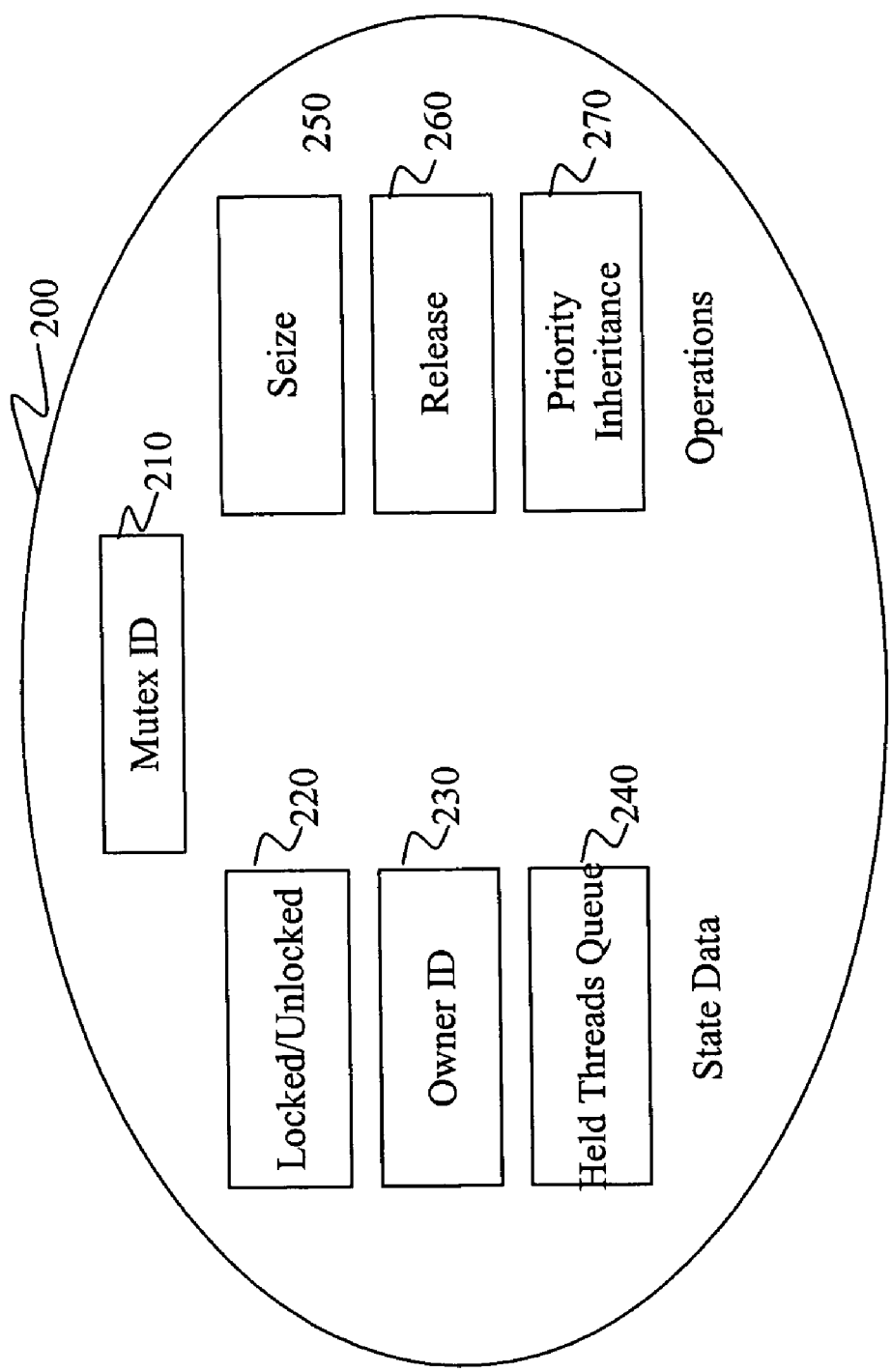
FIG. 2 is a representation of a mutex for providing sequential access to a resource in the distributed system of FIG. 1.
Figure 3:
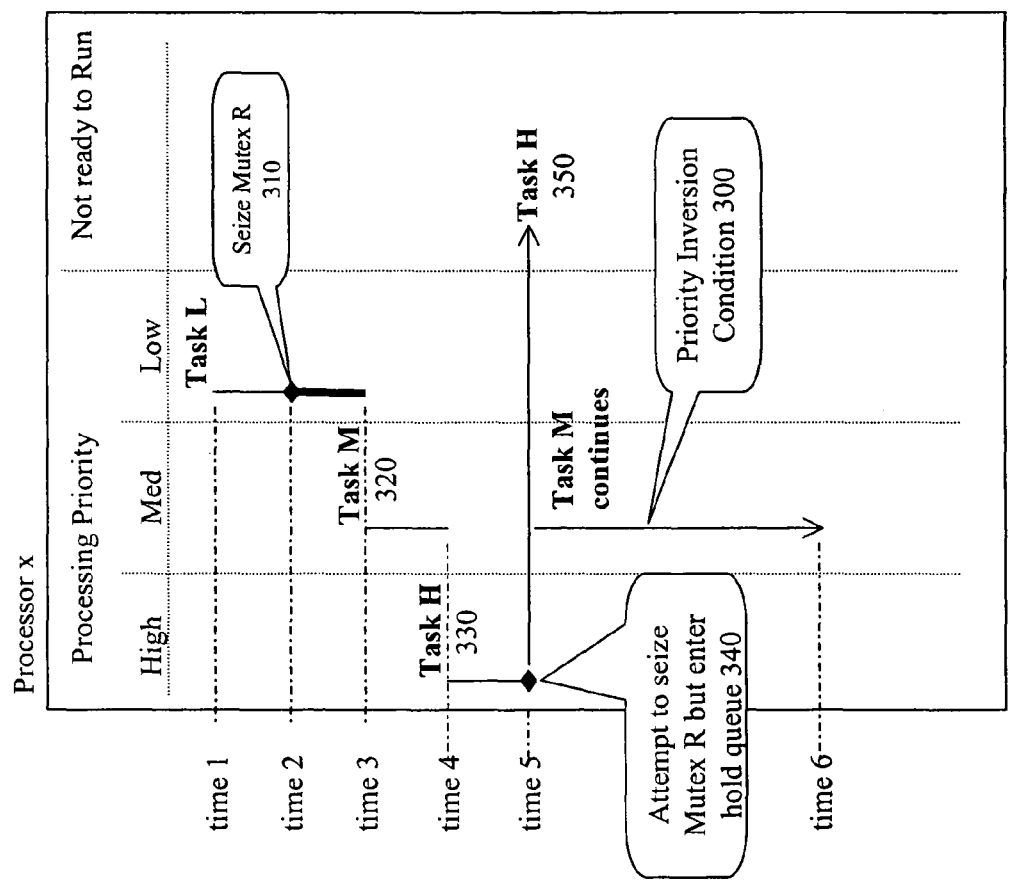
FIG. 3 is a timing diagram illustrating priority inversion, in general
Figure 4:
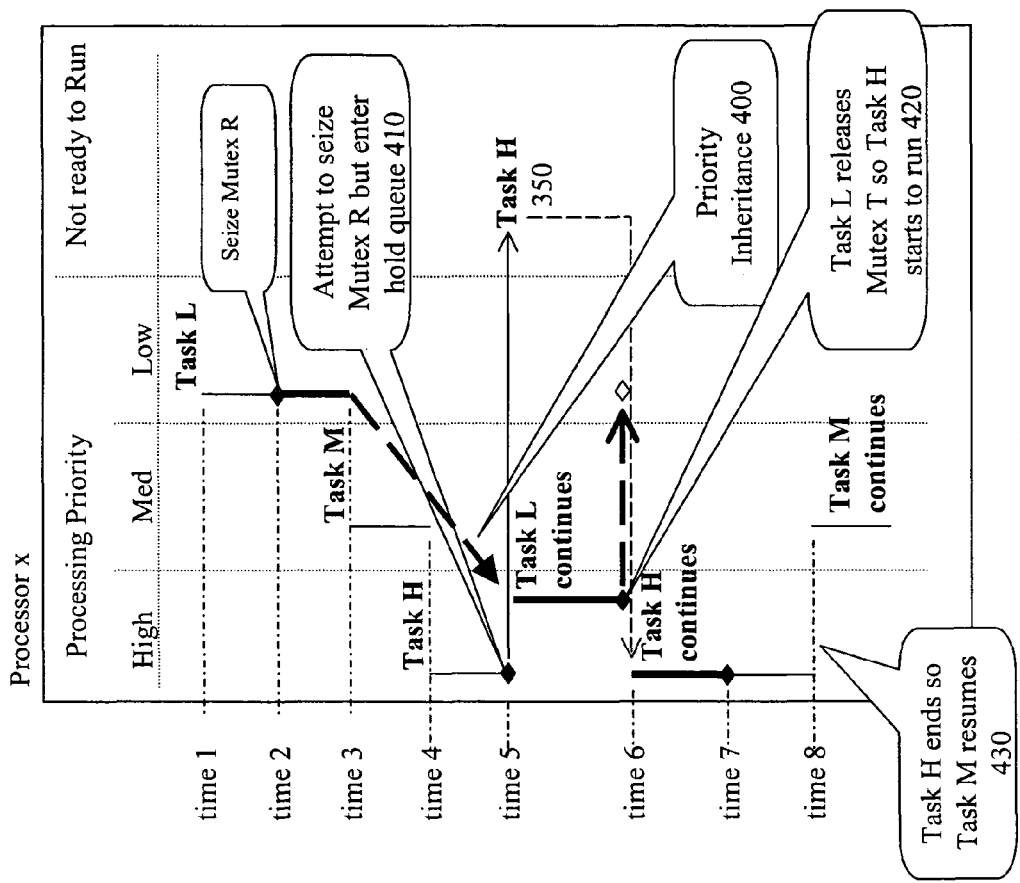
FIG. 4 is a timing diagram illustrating priority inheritance on an individual processor or node of the distributed system of FIG. 1
Figure 5:
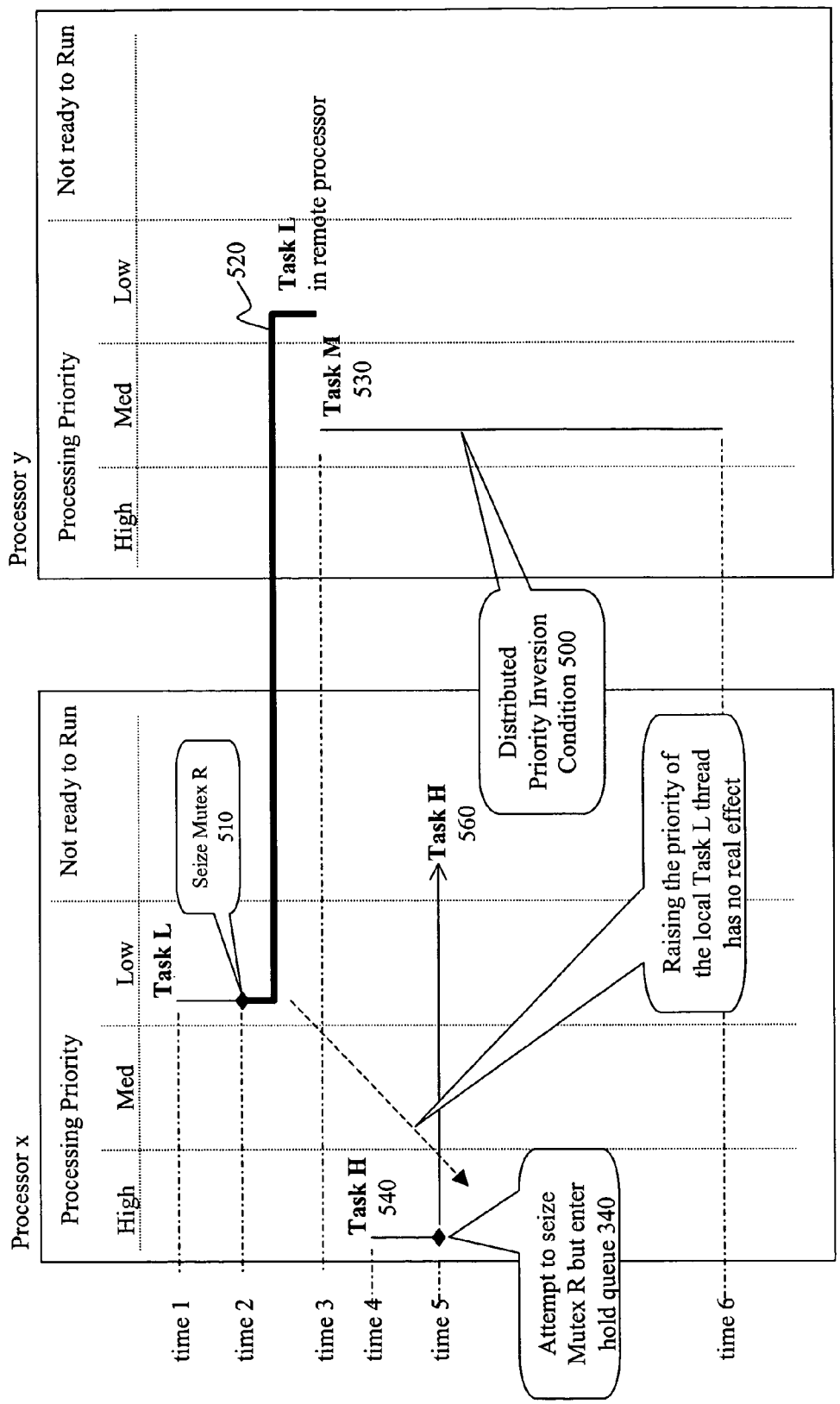
FIG. 5 is a timing diagram illustrating the problem addressed by the invention of priority inversion in a distributed system.

The operations required for remote priority inheritance begin when the client side task (Task L in FIG. 6) seizes the pseudo-mutex (610) in the local processor and writes parameters to initiate the server. Pseudo-mutex Seize processing will set the client-side thread to blocked while simultaneously allowing the execution of application code to initiate and respond to the server. The server side processing accepts the message, adjusts the thread's priority as required, seizes the server-side mutex (620) and then proceeds to any required server processing. The server-side mutex is dedicated to a single application's use of the server so it will always be unlocked as the server is started. However, as in the previous example of FIG. 5, Task M is started and preempts Task L in the remote server.

If some other high priority task, Task H subsequently attempts to seize a mutex held by Task L (for example Mutex R (630)), local RTOS priority inheritance processing will raise the priority of the client-side Task L but doing so, by itself, will have no effect on the preemption of Task L by Task M in the remote server. During the operation to raise priority on the client side, the RTOS will discover that the Task L is blocked in the pseudo-mutex (640). The resulting invocation of the pseudo-mutex (640) will trigger it to generate a message that carries the high priority code (650) on the channel. That is, because the message is sent on the channel and the channel was previously defined to be a connection from a specific source to a specific sink, the pseudo-mutex has a forward pointer facility pointing to the sink-side priority inheritance mutex. On the server side, processing at the requested priority level will attempt to seize the channel sink-side mutex. When that mutex is owned by the original server request, normal (local to the server) mutex Seize processing will include raising the priority of the original server task (Task L at 660). That is, Task L effectively becomes Task L(h).

Because Task L's priority is thus increased in the remote server, it will interrupt Task M, complete its server operations and returns to Processor x. When it completes usage of Mutex R it will Release (675) and revert back to low priority. That event permits Task H to resume, seize mutex R (also preempting Task M) and complete (680).

The cross-processor boundary priority inheritance operation can unwind in several ways. In the event that no priority inheritance operation occurs while the server task is executing then the server task will complete normally, send results to the client and release the server-side mutex. The client task after receiving the results will release the pseudo-mutex (670) and Release processing will change its status so that the RTOS no longer sees the thread as held by the pseudo-mutex. If the client side priority inheritance operation occurs while the server side task is running then the raise priority message will cause the remote RTOS to increase the server task priority. Typically that will enable the server task to complete, return its results and release the server-side mutex. As a result two things happen in parallel. On the server-side the raise priority task is promoted to be owner of the mutex and released. That task needs to do no work (e.g. may be a dummy operation or a No-Op operation) so it immediately releases the mutex and ends. (This description utilizes an asynchronous server invocation. The invention could also be developed to use a synchronous invocation.) On the client side the Client task receives its results, releases the pseudo-mutex and proceeds forward with its inherited priority toward the point where it will unblock the high priority task.

This approach in accordance with the invention is inherently recursive. If the server thread had continued off to a second server then the channel between the server's client-side and the secondary servers would also be guarded by a pseudo-mutex and server-side mutex. As a result the priority inheritance triggered in the initial server would cascade into the secondary server.

Because priority related operations are occurring in processors separated by network delay, race conditions are possible. For example the client side Priority Inheritance operation might occur while the server side was returning results and releasing the mutex. In that event the trigger priority inheritance message will discover that the server-side mutex is unlocked. As a result no server-side priority inheritance will occur, which is the correct action, and the activity will just terminate.

Priority Inheritance Operations can be repetitive. A remote Task L can be promoted to Task L(h1) at one time instance and then to Task L(h2) at some latter instance, where h2>h1. This will occur if two tasks of differing high priority are sequentially contending for a mutex held by Task L. The invention handles this special case as a by-product of normal operation. For purposes of real-time system analysis, this condition is determinate.

Figure 7:
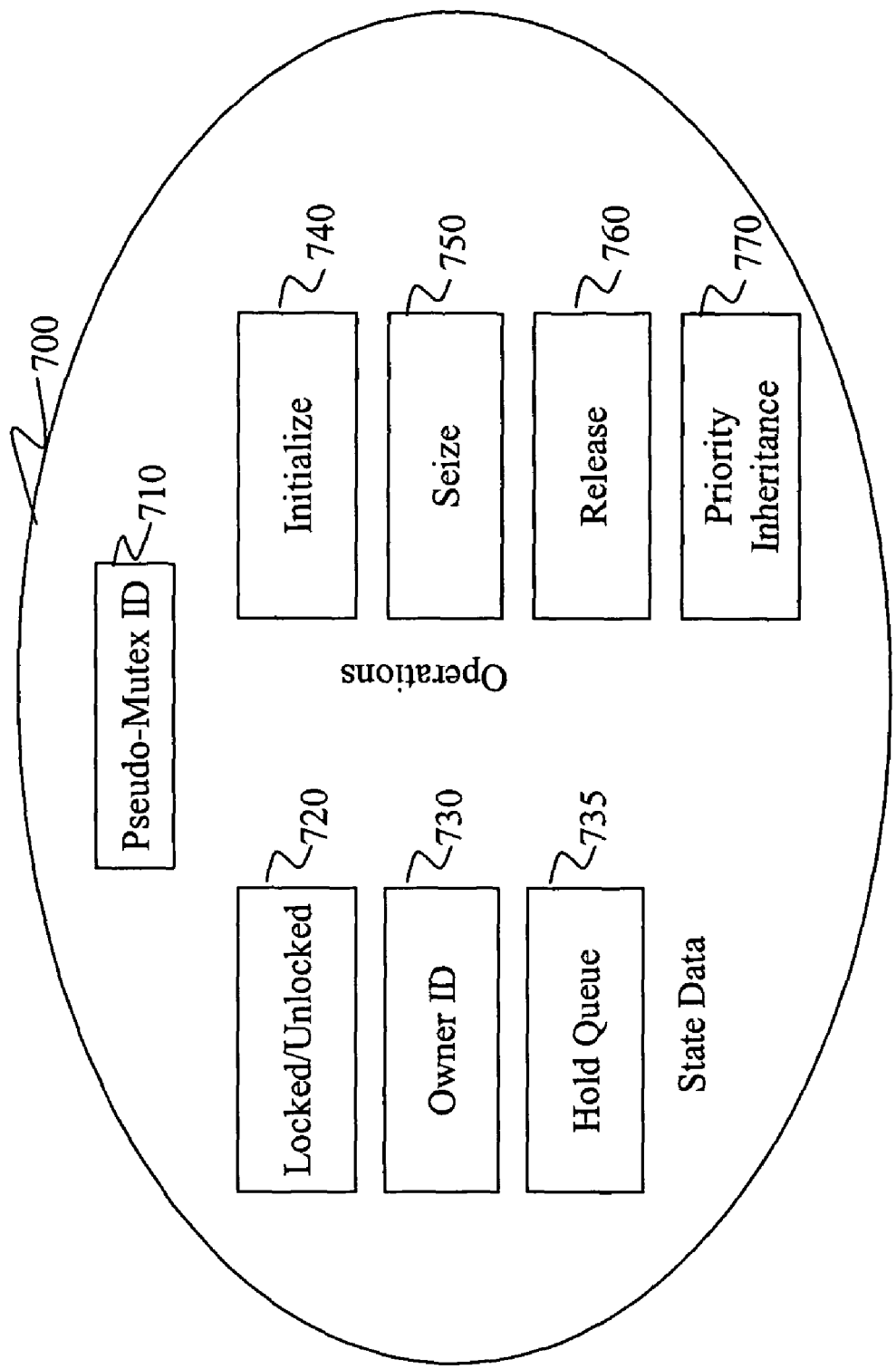
FIG. 7 is a representation of a pseudo-mutex in accordance with the present invention.

More generally, the invention recognizes the features that are required for global priority inheritance and suggests an exemplary pseudo-mutex implementation (700), illustrated in FIG. 7, that will satisfy the requirements. Global Priority Inheritance requires:

1) A mechanism to register a thread that is using a channel—satisfied by the pseudo-mutex including locking (720), hold queue (735), Seize (750) and Release (760) processing as is normal for mutex class objects;

2) A mechanism to permit the RTOS to create a priority inheritance trigger message when local priority inheritance occurs—satisfied by pseudo-mutex Priority Inversion processing (770); and 3) A mechanism to cause priority inheritance on the sink end of the channel—provided by a RTOS priority inheritance mutex on server-side (620).

The invention could be implemented as a part of the RTOS, Middleware or Application.

FIGS. 8A-8D illustrate one possible Initiation, Seize, Release and Priority Inheritance implementation of the pseudo-mutex. This implementation assumes that the server-side is multi-threaded (that is a general requirement for the invention) and that the RTOS middleware or application developer has the option to RTOS register a priority inheritance mutex implemented with code developed on the model of the POSIX standard.

Four operations for a pseudo-mutex are shown in FIGS. 8A-8D but others could be added as specified in POSIX standards for priority inheritance mutexes. The pseudo-mutex requires an initiate process (805) that will spawn a thread for Seize processing. Once spawned (810) the thread progresses immediately to an operation where it waits to synchronize (815) with the pseudo-mutex Seize processing.

To force normal RTOS priority inheritance processing to invoke the pseudo-mutex Priority Inheritance entry, Seize processing must hold the incoming thread while simultaneously allowing the application module associated with the thread to proceed to starting the server. One way this can be accomplished is by using the incoming client-side thread (825) to assign the application module processing to the X-appln thread (830). (This swap requires: modifying the code associated with the X-appln thread to branch to the return address provided in the Client-side thread's Seize invocation and releasing X-appln processing via Seize executing a synchronization operation.) The application code will at a minimum specify four operations (835): save, write, read and release. The save operation could be explicitly provided or it might be a by-product of normal processing. (A pseudo-mutex implemented at the application level might include code in the application to save the target address parameters at a known address or via an added pseudo-mutex operation. If the pseudo-mutex was developed to be part of the middleware then middleware code that set up the channel might retain channel descriptors. If the pseudo-mutex was implanted at the RTOS level then the addressing for the Write Server Start Message (840) parameter block could be retained. In other words, the save operation is actually storing the information that is the forward pointer which may be provided in a number of forms such as the three exemplary forms noted for different implementations but which are not at all critical to the practice of the invention.) After Seize processing synchronizes with X-appln (there will be two threads executing) it can go on to place Client-side thread in the pseudo-mutex hold queue and to set its RTOS descriptor to indicate that it is held behind the pseudo-mutex owner (845). (A pseudo-mutex does not require an owner, but adding that element makes it more compliant with standards. To provide a filler name, the owner can be set to X-appln.)

Figure 8A:
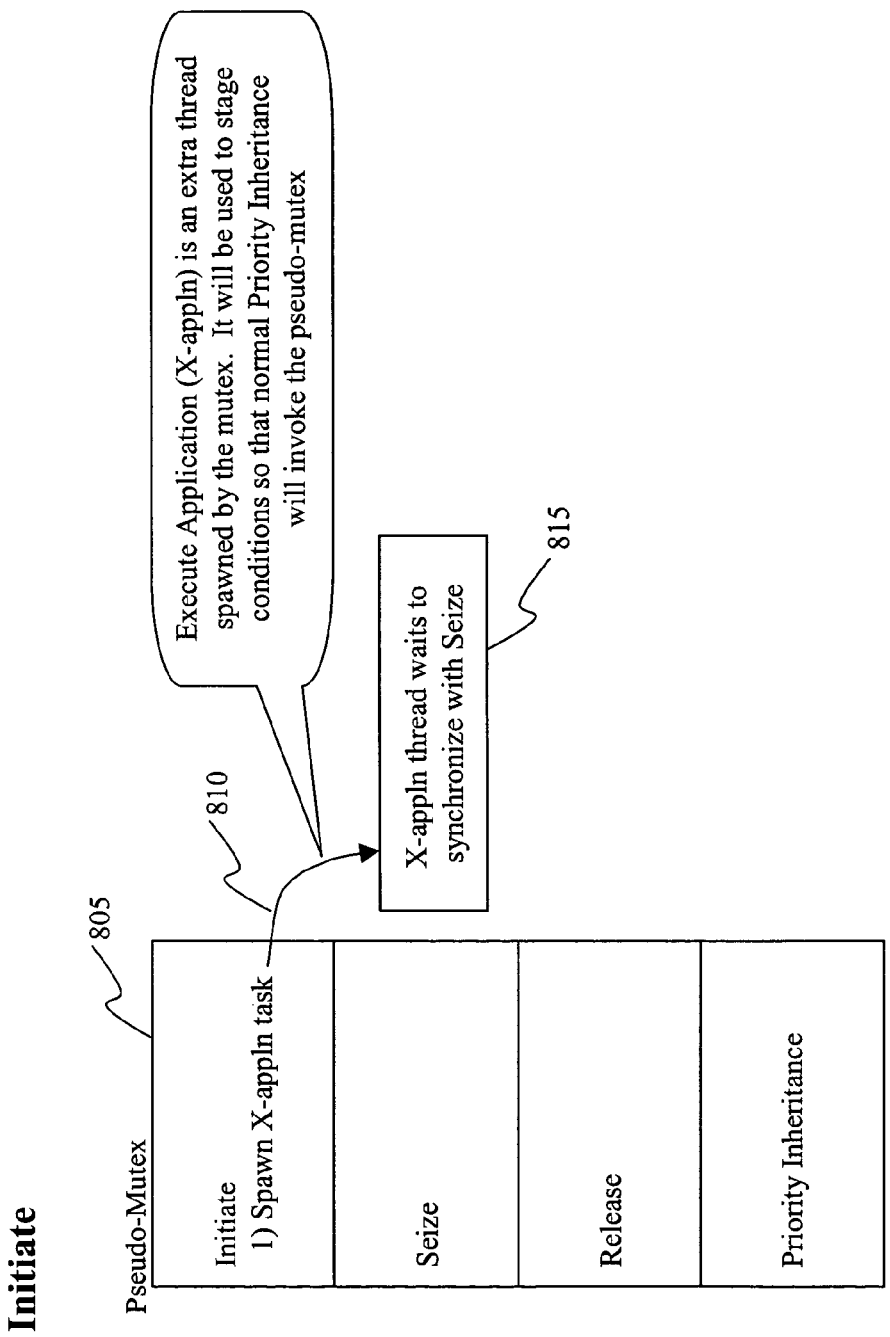
FIGS. 8A, 8B, 8C and 8D are diagrams illustrating operations of the pseudo-mutex of FIG. 7 in accordance with the invention.
Figure 8B:
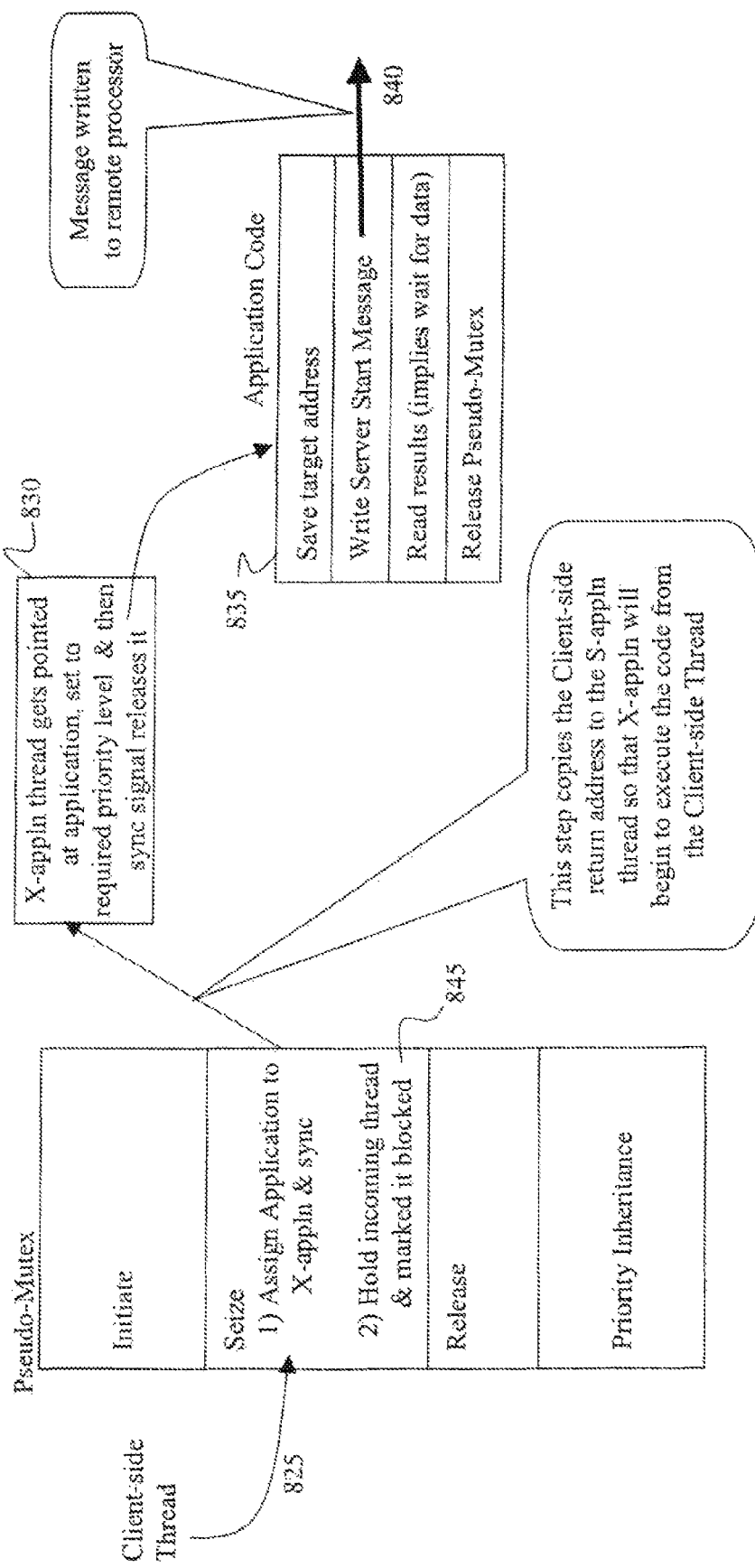
Figure 8C:
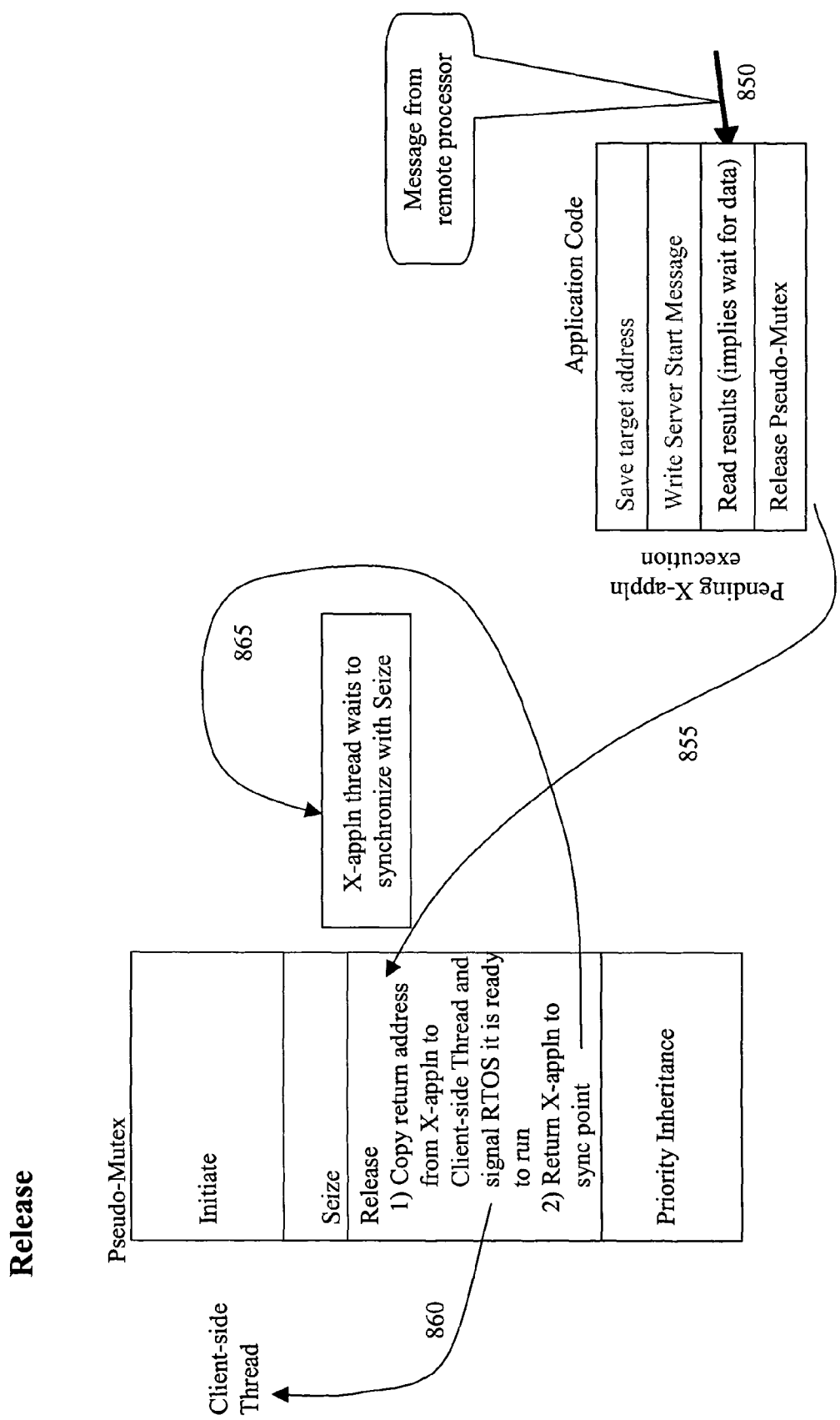

Pseudo-mutex Release processing, illustrated in FIG. 8C, is triggered when server operation results are written back to the client-side (850). That satisfies the pending read operation and results in the X-appln thread executing the Release pseudo-mutex operation (855). The return address provided by X-appln specifies the address where application code expects to go at that stage of its program. Release processing sets up that return operation and then sets the Client-side thread to ready-to-run (860). (The Client-side thread is actually initiated by the RTOS scheduler, normally as a result of Release processing invoking the RTOS task status services.) When the RTOS scheduler returns control to pseudo-mutex Release processing, it will reset the X-appln thread to the synchronization point (865).

Seize and Release processing must address several special cases. If only one instance of X-appln is spawned then only one Client-side thread can simultaneously pass to the server. Making the pseudo-mutex a serially reusable resource will manage this limitation (it can use its own locks and processing so this does not require introduction of an additional mutex). Alternatively the single X-appln thread can be expanded to a thread pool. There is also a potential race condition where the Client-side thread is released and executes a second Seize operation prior to Release completing the processing for X-appln. This can be addressed by locking the pseudo-mutex when X-appln is not ready to run.

Figure 8D:
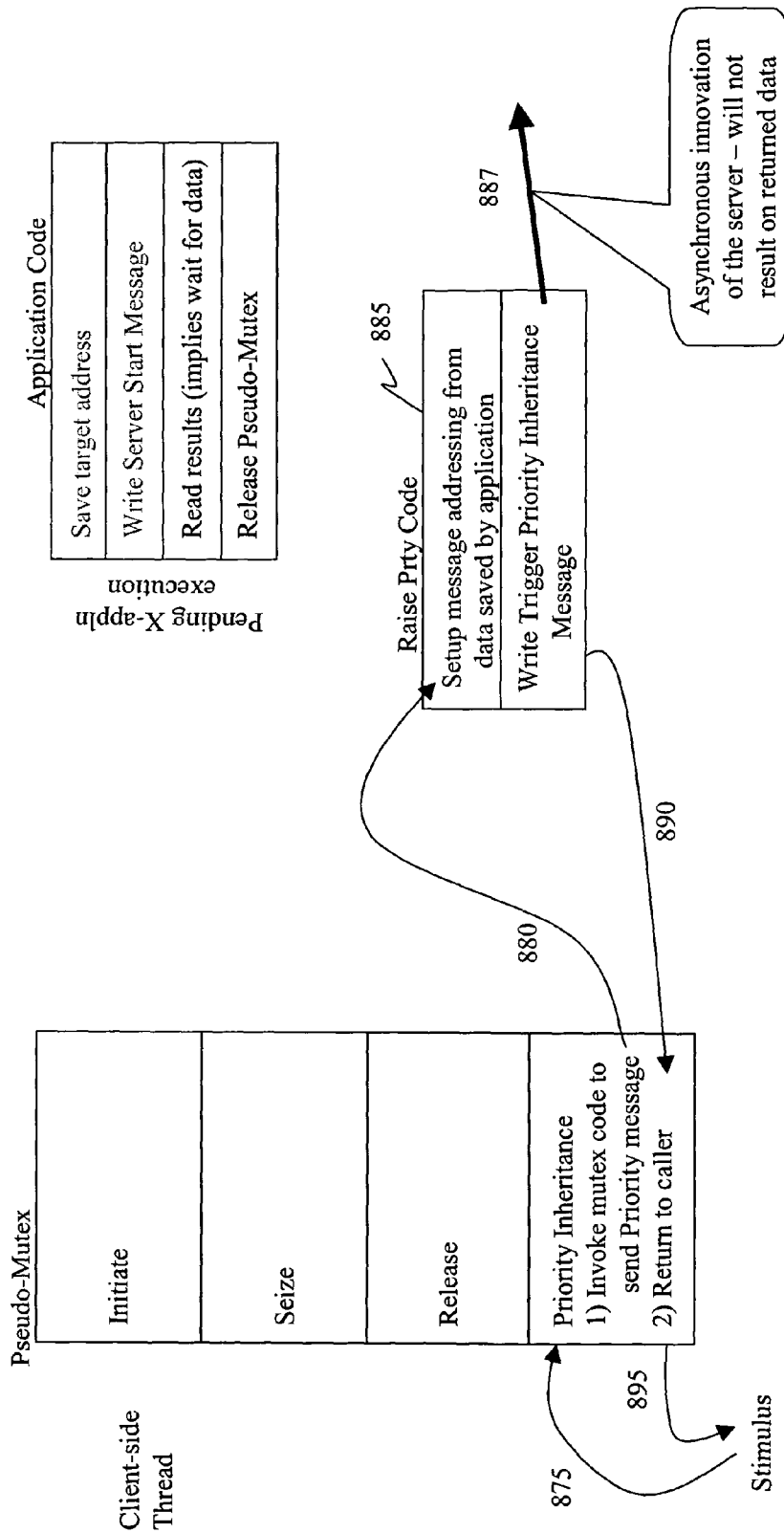

Global Priority Inheritance illustrated in FIG. 8D begins as a Local Priority Inheritance event on the Client-side. When the RTOS raises the priority of the Client-side thread it will discover that the thread is currently held by the pseudo-mutex. That causes an invocation of the pseudo-mutex Priority Inheritance operation (875). Normal mutex Priority Inheritance would result in the mutex owner's priority being changed, but pseudo-mutex Priority Inheritance behaves very differently. It utilizes the thread of execution just received to jump to building the trigger priority inheritance message (880). That processing (885) uses the channel data that was saved during server initiation (835) and then issues the message write to the server. (887). Because the asynchronous server message is used thee is no requirement for trigger priority inheritance message generation to wait for results. Instead the processing returns to the caller (RTOS via 890 and 895). If X-appln thread pools are used then Priority Inheritance must be generalized to utilize channel data associated with a specific client-side thread.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A mutual exclusion arrangement in a computer system for operation at a first processor for providing only sequential access to a sequentially-reusable resource available at a second processor, said first and second processors communicating through a network including a plurality of processors which provide priority inheritance among locally originating tasks, said mutual exclusion arrangement including
   a mutual exclusion lock for said resource, said mutual exclusion lock comprising
      means for storing an identification of said mutual exclusion arrangement,
      means for storing state information including whether said mutual exclusion lock is locked or unlocked and, if locked, an identification of a task causing that lock,
      a queue of tasks seeking a lock on said mutual exclusion lock, and
      means for executing seize, lock, and release operations, said mutual exclusion arrangement further comprising
      means for storing a forward pointer to said second processor, which pointer may be set in response to a task having a higher priority than said task causing said lock on said mutual exclusion lock being placed in said queue, and
      means for causing an operation to be started locally on said second processor in accordance with said forward pointer, at a priority at least equal to a priority of said task being placed in said queue,
   whereby priority of said task causing said lock is raised or priority inheritance is triggered at said second processor from said first processor, such that said task at said second processor is executed to completion at said higher priority.

2. The mutual exclusion arrangement as recited in claim 1, wherein said mutual exclusion arrangement is a software mutual exclusion object.

3. The mutual exclusion arrangement as recited in claim 1, wherein said operation to be started locally on said second processor is a Raise_Priority operation.

4. The mutual exclusion arrangement as recited in claim 1, wherein said operation to be started locally on said second processor is a dummy operation.

5. The mutual exclusion arrangement as recited in claim 4, wherein said dummy operation is a No-Op operation.

6. A real-time computing system having first and second processors, said real-time computing system including
   a mutual exclusion arrangement for operation at a first processor for providing only sequential access to a sequentially-reusable resource available at a second processor, said first and second processors communicating through a network including a plurality of processors which provide priority inheritance among locally originating tasks, said mutual exclusion arrangement including
   a mutual exclusion lock for said resource, said mutual exclusion lock comprising
      means for storing an identification of said mutual exclusion lock,
      means for storing state information including whether said mutual exclusion arrangement is locked or unlocked and, if locked, an identification of a task causing that lock,
      a queue of tasks seeking a lock on said mutual exclusion lock, and
      means for executing seize, lock, and release operations, said mutual exclusion arrangement further comprising
      means for storing a forward pointer to a second processor, which pointer may be set in response to a task having a higher priority than said task causing said lock on said mutual exclusion lock being placed in a queue,
      means for causing an operation to be started locally on said second processor, in accordance with said pointer at a priority at least equal to said task being placed in said queue, and
   a remote mutual exclusion arrangement including means for causing execution of said task being placed in a queue as a local operation on said second processor and raising priority or triggering priority inheritance of a task of said second processor from said first processor, such that said task at said second processor is executed to completion at said higher priority.

7. The system as recited in claim 6, wherein said operation to be started locally on said second processor is a Raise_Priority operation.

8. The system as recited in claim 6, wherein said operation to be started locally on said second processor is a dummy operation.

9. The system as recited in claim 8, wherein said dummy operation is a No-Op operation.

10. A method of providing priority inheritance across nodes of an open-ended data processing system including first and second processors communicating through a network including a plurality of processors which provide priority inheritance among locally originating tasks, said method including steps of detecting, at said first processor, priority inversion between a lower priority task and a higher priority task at said second processor of said data processing system, setting a forward pointer to a remote priority inheritance mutex at said second processor, and initiating, from said remote priority inheritance mutex, an operation having priority at least equal to said high priority task to be locally performed at said second processor, in accordance with said pointer, whereby priority inheritance is performed such that priority of said lower priority task is raised or priority inheritance is triggered and a low priority task at said second processor is executed to completion at said priority at least equal to said high priority task.

11. The method as recited in claim 10, wherein said operation to be started locally on said second processor is a Raise_Priority operation.

12. The method as recited in claim 10, wherein said operation to be started locally on said second processor is a dummy operation.

13. The method as recited in claim 12, wherein said dummy operation is a No-Op operation.

14. The method as recited in claim 10, wherein said low priority task at said second processor is executed to completion at said higher priority without preemption.

15. The method as recited in claim 10, wherein said step of setting a forward pointer is implemented in an application as a target address.

16. The method as recited in claim 10, wherein said step of setting a forward pointer is implemented in middleware as a channel descriptor.

17. The method as recited in claim 10, wherein said step of setting a forward pointer is implemented in an operating system as a retained address for the write server start message.

* * * * *